(12) United States Patent
Kulkarni et al.

(10) Patent No.: US 8,489,580 B2
(45) Date of Patent: Jul. 16, 2013

(54) QUERY OPTIMIZATION

(75) Inventors: Vaibhav Murlidhar Kulkarni, Karnataka (IN); Sweta Singh, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/909,029

(22) Filed: Oct. 21, 2010

(65) Prior Publication Data

US 2012/0102060 A1   Apr. 26, 2012

(51) Int. Cl.
*G06F 7/00* (2006.01)
*G06F 17/30* (2006.01)

(52) U.S. Cl.
USPC .......................................... 707/713; 707/759

(58) Field of Classification Search
USPC .................................. 707/713, 759
See application file for complete search history.

(56) References Cited

U.S. PATENT DOCUMENTS

| | | | |
|---|---|---|---|
| 7,152,073 B2 | 12/2006 | Gudbjartsson | |
| 2002/0064296 A1 | 5/2002 | Kondo | |
| 2002/0143754 A1* | 10/2002 | Paulley et al. | 707/3 |
| 2003/0100960 A1* | 5/2003 | Edwards et al. | 700/28 |
| 2007/0027845 A1 | 2/2007 | Dettinger | |
| 2008/0040317 A1 | 2/2008 | Dettinger | |
| 2010/0005077 A1 | 1/2010 | Krishnamurthy | |
| 2010/0275192 A1* | 10/2010 | Serebryany | 717/151 |

OTHER PUBLICATIONS

"Study of preference driven database query systems," ILIOIU FLORIN, MASTER Informatique (Université de Rennes I)—Feb. 2006, Coordinator: Daniel Rocacher (ENSSAT—LANNION), Ludovic Liétard (IUT—LANNION).

* cited by examiner

*Primary Examiner* — Charles Lu
(74) *Attorney, Agent, or Firm* — Anthony V S England; Elissa Wang; Gerald R Woods (57) ABSTRACT

A first query is received including a logical expression as a set of predicates in Disjunctive Normal Form. Each predicate from is represented as a bitwise predicate pattern to generate a set of bitwise predicate patterns. A set of valid bitwise patterns from the set of bitwise predicate patterns is identified using the first query. The set of valid bitwise patterns is parsed using logical operators to generate a logical bitwise expression. The logical bitwise expression is factored and the factored logical bitwise expression is mapped to corresponding predicates to generate a logical predicate expression. A second query is generated, which includes modifying the first query using the logical predicate expression and at least one logical operator. A subset of data is retrieved from the data repository using the second query.

9 Claims, 4 Drawing Sheets

QUERY OPTIMIZATION

TECHNICAL FIELD

Embodiments of the present invention relate to query optimization, and more particularly to retrieving a subset of data from a data repository using the query optimization.

BACKGROUND

Databases are a type of data repository in computerized information storage and retrieval systems. A database query refers to one or more commands or clauses for retrieving data stored in one or more databases. Queries may come from users, application programs, or remote systems. A query may specify a specific location, such as, a table or a column in a database to retrieve data from, how to join columns from multiple tables, and conditions that must be satisfied for a particular data record to be included in a query result set. Current day structured data, such as relational databases, typically support queries composed in an exacting format specified by a query language. For example, the widely used Structured Query Language (SQL) is supported by many relational databases.

There are many disciplines, such as life sciences, that rely on databases and require increasingly complex databases and database queries. Running large or complex query typically uses multiple resources and has been a subject of study and interest.

BRIEF SUMMARY

Embodiments of the invention are directed to a method, a system and a computer program product for retrieving a subset of data from a data repository. Accordingly, embodiments of the invention receive a first query, which includes a set of logical predicates. In one aspect, the logical predicates may be in Disjunctive Normal Form. For the set of logical predicates, embodiments of the invention represent each unique predicate as a bitwise predicate pattern, thereby providing a set of bitwise predicate patterns corresponding to the set of logical predicates. Further, embodiments generate a second query using the set of bitwise predicate patterns and a plurality of logical operators. The second query is used to retrieve the subset of data from the data repository.

Yet further embodiments identify a set of valid bitwise patterns from the set of bitwise predicate patterns using the first query and parse the set of valid bitwise patterns using the plurality of logical operators to generate a logical bitwise expression. Embodiments further factor the logical bitwise expression and map the factored logical bitwise expression to corresponding predicates from the set of predicates to generate a logical predicate expression. Generating the second query includes modifying the first query using the logical predicate expression. In embodiments, the plurality of logical operators includes Boolean operators and the parsing and factoring use Boolean properties. In further embodiments, the data repository includes structured data and the first and second queries are both Structured Query Language queries.

BRIEF DESCRIPTION OF THE DRAWINGS

Embodiments of the invention are described below, by way of example only, with reference to the following schematic drawings, where.

DETAILED DESCRIPTION

Figure 1:
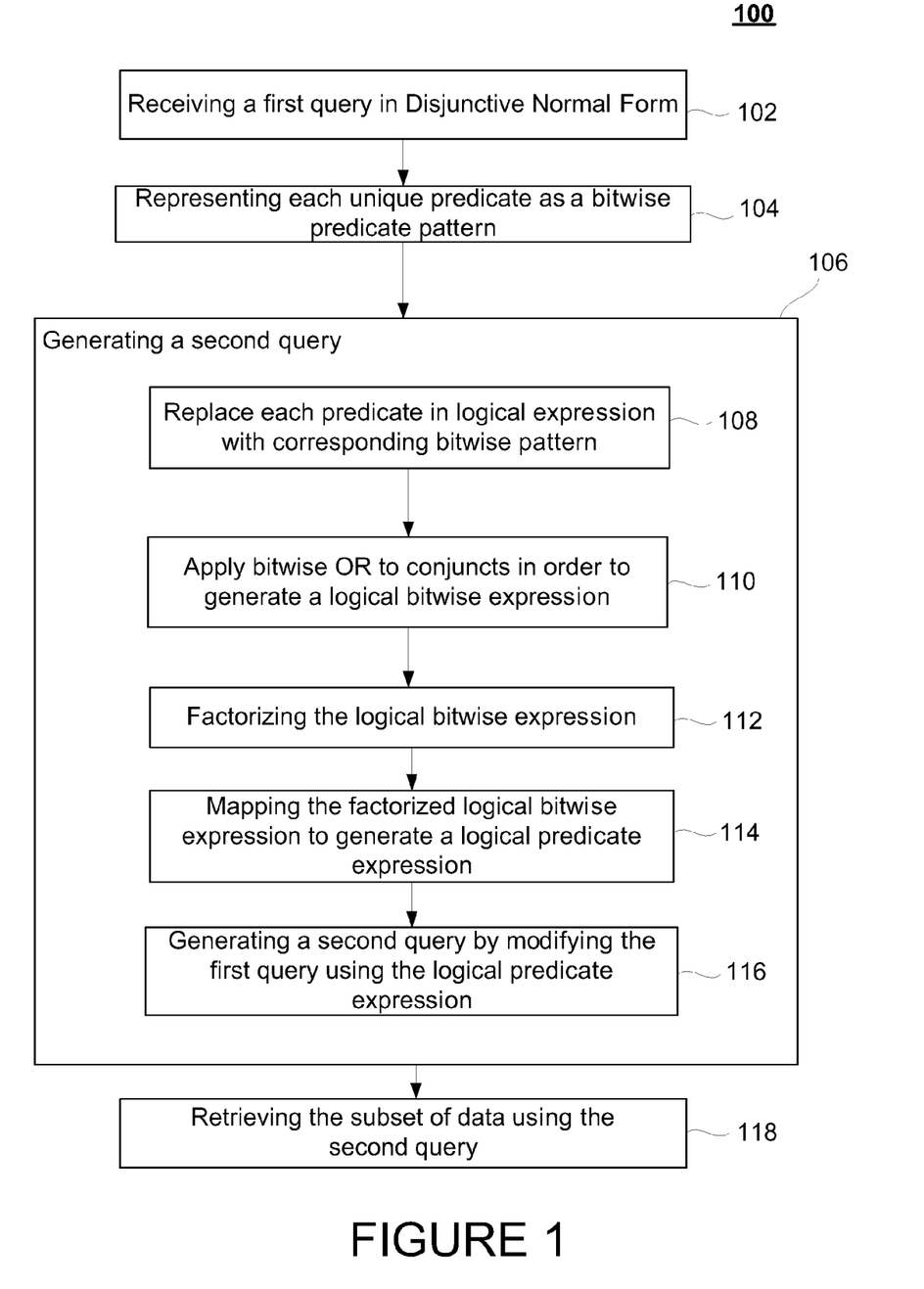
FIG. 1 illustrates an exemplary embodiment of a flow chart for a method of retrieving a subset of data from a data repository.

Embodiments of the invention are directed to a method, a system and a computer program product for retrieving a subset of data from a data repository. FIG. 1 shows an exemplary embodiment of a flow chart 100 for retrieving a subset of data from a data repository. Step 102 illustrates receiving a first query including a logical expression in Disjunctive Normal Form. The term "Disjunctive Normal Form" refers to a disjunction of one or more conjunctions of one or more literals, i.e., predicates represented symbolically. Step 104 illustrates representing each unique predicate of the set of predicates as a bitwise predicate pattern to generate a set of bitwise predicate patterns and step 106 illustrates generating a second query using the set of bitwise predicate patterns and a plurality of logical operators. The plurality of logical operators comprises Boolean operators. Step 118 illustrates retrieving the subset of data from the data repository using the second query. The step of generating the second query further includes multiple steps—step 108 through step 116. Step 108 illustrates replacing predicates in the logical expression by their corresponding bit wise pattern and step 110 illustrates applying bit-wise OR to the conjuncts to generate a logical bit wise expression. Step 112 further illustrates factorizing the logical bitwise expression. The steps of parsing and factorizing use Boolean properties. Step 114 illustrates mapping the factorized logical bitwise expression to corresponding predicates from the set of predicates to generate a logical predicate expression and step 116 further illustrates generating the second query by modifying the first query using the logical predicate expression.

In one embodiment of the invention, the data repository is a structured data and the first query and the second query are both Structured Query Language queries. The first query includes logical expression in Disjunctive Normal Form.

An exemplary embodiment is described as follows, in which business decisions are based on meeting a set of prerequisites. For yearly bonus distribution, an employee that satisfies a set of conditions, i.e. predicates, is eligible for a bonus. The exemplary predicates are as follows:

A. Performance rating (hereinafter also referred to as rating), typically defined as a number or alpha numeric character, such as 1 or 2+.
    B. Recommended by Manager (hereinafter also referred to as Manager_Recom)
    C. Business unit profit >4% (hereinafter also referred to as BU_profit)
    D. Salary is less than average salary at his level
    E. Employed in the organization for more than 2 years (hereinafter also referred to as Current_dt-Join_dt)

In one embodiment, employee data is stored in a database. Accordingly, an appropriate query is designed and written to get records of employee who meet the above described prerequisites, that is, a subset of data stored in the database. Typically a query is written using a combination of 'AND' and 'OR' clauses in SQL, such that the query selects from the database (i.e., a table) rows that match a set of conditions. Assuming all the data is available in an employee table, a query for the above described prerequisites may be in the following Disjunctive Normal Form:

select * from employee where
((Rating in (1,2+)) and (Manager_Recom='Y') and (BU_profit>4)) OR
((Rating in (1,2+)) and (Manager_Recom='Y') and (Salary<(select Avg(Salary) from employee))) OR
((Rating in (1,2+)) and (Manager_Recom='Y') and (Current_dt-Join_Dt>2 years)) OR
((Rating in (1,2+)) and (BU_profit>4) and (Salary<(select Avg(Salary) from employee))) OR
((Rating in (1,2+)) and (BU_profit>4) and (Current_dt-Join_Dt>2 years)) OR
((Rating in (1,2+)) and (Salary<(select Avg(Salary) from employee)) and (Current_dt-Join_Dt>2 years)) OR
((Manager_Recom='Y') and (BU_profit>4) and (Salary<(select Avg(Salary) from employee))) OR
((Manager_Recom='Y') and (BU_profit>4) and (Current_dt-Join_Dt>2 years)) OR
((Manager_Recom='Y') and (Salary<(select Avg(Salary) from employee)) and (Current_dt-Join_Dt>2 years)) OR
((BU_profit>4) and (Salary<(select Avg(Salary) from employee)) and (Current_dt-Join_Dt>2 years))

For the above query, which has a number of OR clauses and predicates, it is difficult to reduce the number of predicates in conventional SQL.

Embodiments of the invention use a bit representation for predicates internally in an optimizer to help reduce the number of predicates in the SQL query. Condensing the predicates tends to help reduce the processing cycles required to execute the query, thus improving query performance. Overall, it tends to reduce resource consumption, including CPU, power and the like. To more nearly optimize queries, the exemplary embodiments described herein may use the following well known Boolean properties:

| Associative property: | (a ‖ b) ‖ c = a ‖ (b ‖ c) |
| --- | --- |
| | (a & b) & c = a & (b & c) |
| Distributive Property: | a ‖ (b & c) = (a ‖ b) & (a ‖ c) |
| | a & (b ‖ c) = (a & b) ‖ (a & c) |

It should be noted here that herein logical 'AND' is expressed as '&' or '*', and logical 'OR' is expressed as '‖' or '+'. Bitwise 'OR' is expressed as '|'. Absence of any operator between two expressions is assumed to be 'AND', and can be described for example as 01(0+1), which is equivalent to 0&1&(0‖1) i.e. 0*1*(0+1)

The following example below illustrates a variable-based logical expression corresponding to the above described Disjunctive Normal Form query from the employee table:
(A & B & C)‖(A & B & D)‖(A & B & E)‖
(A & C & D)‖(A & C & E)‖(A & D & E)‖
(B & C & D)‖(B & C & E)‖(B & D & E)‖
(C & D & E)

Using the distributive property of Boolean algebra, the expression can be represented as follows:
(A&B&(C‖D‖E))‖
(A&(C&D‖C&E‖D&E))‖
(B& (C&D‖C&E‖D&E))‖
(C & D & E)

By again applying the distributive property, the expression can be further simplified to the following:
(A&B&(C‖D‖E))‖(A‖B) & (C&D‖C&E‖D&E))‖(C & D & E)

This expression is a desirable result. It can also be represented in a bitwise manner described herein below.

According to an embodiment of the invention, the database optimizer processes a first query, such as the above described query of the employee table, and generates a more nearly optimal second query. The resulting second query may be the query as follows, for example:

select * from employee where
((Rating in (1,2+) and Manager_Recom='Y' and (BU_profit>4 or (Salary<(select Avg(Salary) from employee)) or Current_dt-Join_Dt>2 years)
OR
((Rating in (1,2+) OR Manager_Recom='Y') AND ((BU_profit>4 and (Salary<(select Avg(Salary) from employee))) or (BU_profit>4 and Current_dt-Join_Dt>2 years) or (Salary<(select Avg(Salary) from employee) and Current_dt-Join_Dt>2 years))
OR
(BU_profit>4 and (Salary<(select Avg(Salary) from employee)) and Current_dt-Join_Dt>2 years))

In the following, the flowchart of FIG. 1 is related to the above example. A query is received in step 102, where the above described first query of the employee table may be represented as follows:

select * from table
where (A and B and C) OR (A and B and D) OR (A and B and E) OR
(A and C and D) OR (A and C and E) OR (A and D and E) OR
(B and C and D) OR (B and C and E) OR (B and D and E) OR
(C and D and E)

Each unique predicate is represented 104 by a bitwise predicate pattern. In this example:
E is represented by 00000001
D is represented by 00000010
C is represented by 00000100
B is represented by 00001000
A is represented by 00010000

The following should be appreciated regarding the above example and regarding how the bitwise predicate patterns are formed, in an embodiment:

Each logical predicate is represented by a set of bits.
Such a set of bits is referred to herein as a "bitwise predicate pattern."
Each set may have the same number of bits.
Each bitwise predicate pattern has only one bit ON.
Each bitwise predicate pattern uniquely represents a single corresponding one of the logical predicates,
For each bitwise predicate pattern, the one bit that is ON indicates which one of the logical predicates the particular bitwise predicate pattern represents.

Step 106 uses the first query and Boolean operators to generate a second query. Step 106 of generation of the second query has multiple steps—step 108 through step 116. Step 108 replaces each predicate in the query by its corresponding bitwise pattern. For example, as defined above, the logical expression can be represented in bit wise pattern, as follows:
select * from table where
(00010000|00001000|00000100)+(00010000|00001000|00000010)+(00010000|00001000|0000
0001)+(00010000|00000100|0000

0010)+(00010000|00000100|00
000001)+(00010000|00000010|0000
0001)+(00001000|00000100|00000010)+(000
01000|00000100|00000001)+(00001000|000
00010|00000001)+(00000100|00000010|00000001)
Here, the Logical 'AND' conjunct has been replaced by bit wise 'OR' operator.

Step 110 then applies bit wise OR operator to condense the conjuncts, as illustrated below:
00011100+00011010+00011001+00010110+00 010101+ 00010011+00001110+00001101+00001011+00000111

Step 112 factors the above logical bitwise expression using the Boolean distributive property, combining the last 3 bits together to form a logical bitwise expression, as illustrated below:
00011(100+010+001)+00010(110+101+011)+0
0001(110+101+011)+00000(111)

The expression can be further factored, as illustrated below:
00011(100+010+001)+(00010+00001)(011+
101+110)+00000(111)

Step 114 uses the compressed or factored logical bitwise expression to generate a logical predicate expression by mapping the predicates in the first query on to the bits yielding the following exemplary logical predicate expression, as illustrated below:
(A and B and (C or D or E)) OR (A or B) AND (C and D or C and E or D and E)) OR (C and D and E)

Step 116 then uses the above defined logical predicate expression to generate a second query, which is now an optimized query, as illustrated below:
select * from table where
(A and B and (C or D or E)) OR (A or B) AND (C and D or C and E or D and E)) OR (C and D and E)

Step 118 uses the above optimized/second query to run against the database. This query yields a subset of data from the database that satisfies the minimum number of predicates.

Embodiments of the invention may use a plurality of 'OR' or 'or' clauses in SQL. In yet a further exemplary embodiment, if there are only two predicates A and B in a SQL query, out of which one needs to be true for the SQL to retrieve valid subset, the conventional SQL query can be represented as:
select * from Table1 where A OR B.
Embodiments of the invention will yield better performance when the number of predicates and the 'OR' clauses are more in the conventional SQL query.

Figure 2:
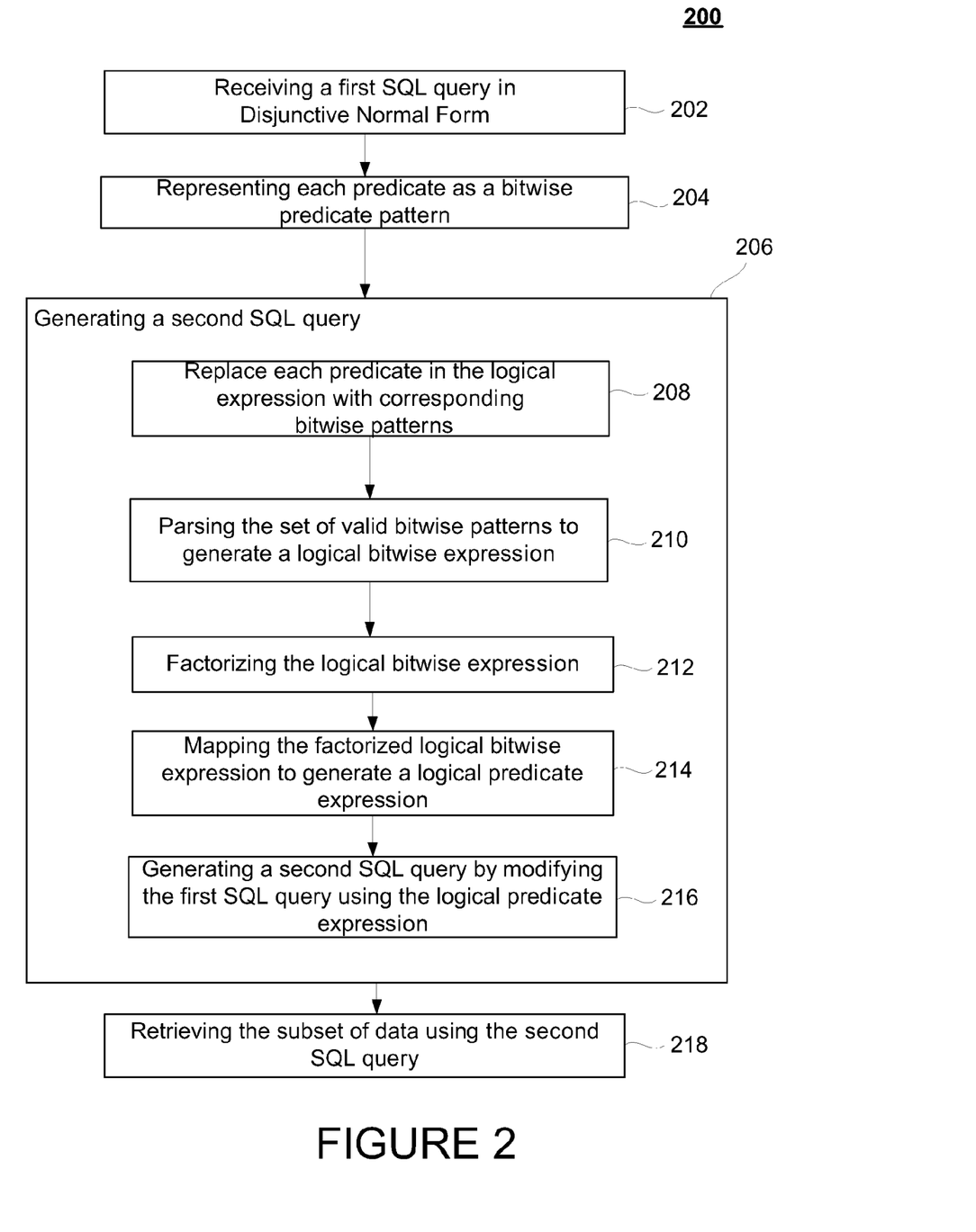
FIG. 2 illustrates an exemplary embodiment of a flow chart for a method of retrieving a subset of data from a relational database.

FIG. 2 illustrates an exemplary embodiment of a flow chart 200 for an overall method of retrieving a subset of data from a relational database. It should be noted that flow chart 200 is similar to flow chart 100 of FIG. 1, except that FIG. 2 pertains to a data repository that is a relational database, and both first query and second query are SQL queries. Step 202 illustrates receiving a first SQL query, including a logical expression having a set of predicates in Disjunctive Normal Form. Step 204 illustrates representing each of the predicates as a bitwise predicate pattern, thereby generating a set of bitwise predicate patterns. Step 206 depicts generating a second SQL query using the set of bitwise predicate patterns and at least one logical operator. The or more logical operators advantageously are Boolean operators, in an embodiment. Step 218 illustrates retrieving the subset of data from the relational database using the second SQL query.

The step of generating the second SQL query may further include multiple steps—step 208 through step 216. Step 208 illustrates replacing predicates in the logical expression using the first SQL query by their corresponding bit wise pattern. Step 210 illustrates applying bit-wise OR to the conjuncts to generate a logical bit wise expression. Step 212 illustrates factoring the logical bitwise expression. The steps of parsing and factoring use Boolean properties. Step 214 further illustrates mapping the factored logical bitwise expression to corresponding predicates from the set of predicates to generate a logical predicate expression. Step 216 illustrates generating the second SQL query by modifying the first SQL query using the logical predicate expression.

Figure 3:
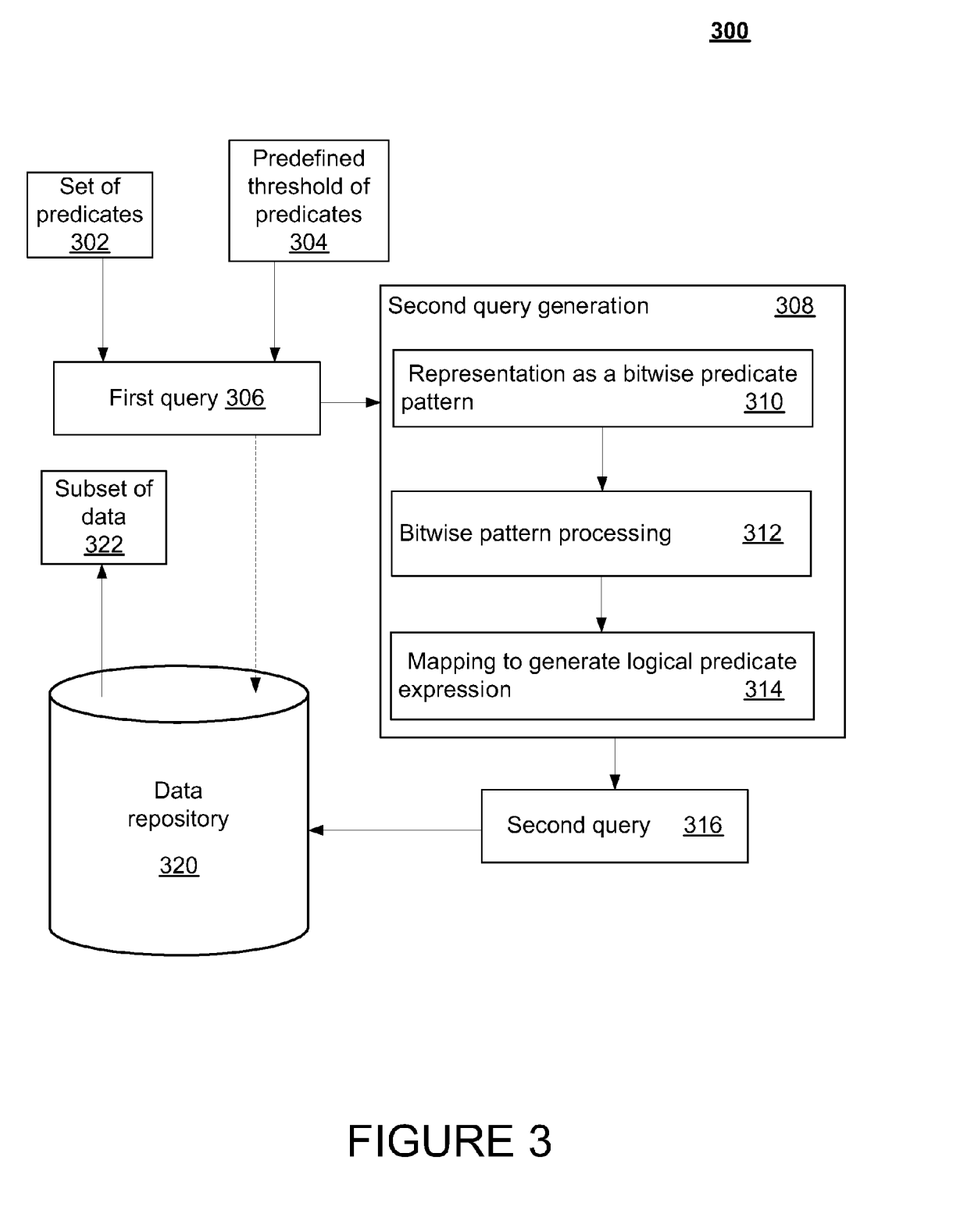
FIG. 3 illustrates an exemplary embodiment of a schematic of retrieval of a subset of data from a data repository.

FIG. 3 depicts an exemplary embodiment of a schema 300 of retrieving a subset of data from a data repository. Schema 300 depicts a first query 306, a second query generation 308, a second query 316, a data repository 320 and a subset of data 322. First query 306 includes a set of predicates in Disjunctive Normal Form 302. First query 306 is used by second query generation 308 to generate second query 316. In an exemplary embodiment, second query generation 308 includes three blocks that are adapted to represent and process bitwise predicate pattern. Representation as a bitwise predicate pattern 310 is adapted to represent the set of predicates in a bitwise predicate pattern as described in step 104 of FIG. 1. Bitwise pattern processing 312 uses these bitwise predicate patterns to generate factorized logical bitwise patterns. Bitwise pattern processing 312 is adapted to perform the steps 108 through 112 of FIG. 1. Mapping to generate logical predicate expression 314 is adapted to perform step 114 of FIG. 1. Second query generation 308 is adapted to perform step 116 of FIG. 1. Second query 316 is run against data repository 320 to generate subset of data 322.

First query 306 may also be run against data repository 320 and is configured to generate the same subset of data 322, however, if there are a large number of conditional predicates, then there is a possibility of reduction in performance. Converting first query 306 to second query 316 using second query generation 308, reduces the computation required and hence may have desirable effect on the CPU usage and hence performance, and still produce the same subset of data 322.

Figure 4:
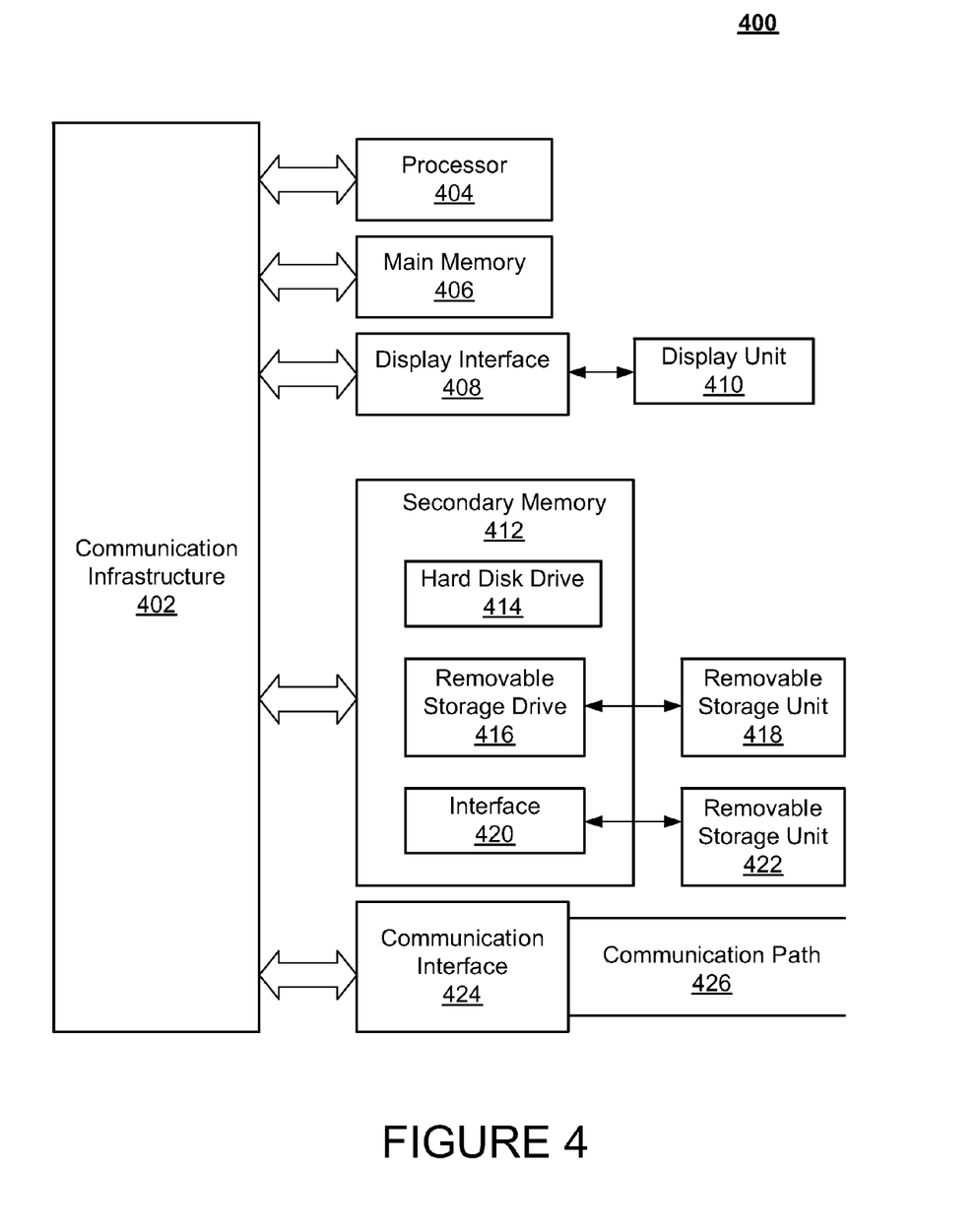
FIG. 4 shows an exemplary embodiment of a data processing system computer system used for retrieving a subset of data from a data repository.

FIG. 4 illustrates a block diagram of an exemplary data processing system 400 (hereinafter also referred to as a computing system or computer system), having at least a processor and a memory, configured for processing information, which can be used for implementing various embodiments of the present invention. In some embodiments, the computer system 400 can be used to implement exemplary embodiments of the invention illustrated in FIGS. 1 to 3. Computer system 400 includes a processor 404. It should be understood although FIG. 4 illustrates a single processor, one skilled in the art would appreciate that more than one processor can be included as needed. The processor 404 is connected to a communication infrastructure 402, for example, a communications bus, cross-over bar, or network, where the communication infrastructure 404 is configured to facilitate communication between various elements of the exemplary computer system 400. Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface, for example that found in video game devices, a removable memory chip, for example an EPROM, or PROM, and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCMCIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. These propagated signals are provided to the communications interface 424 via a communications path (that is, channel) 426. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of some embodiments of the invention include optimal usage of computing resources, such as, but not limited to the Central Processing Unit (CPU). Although the invention explains various advantages of some specific embodiments of the invention, those skilled in the art will appreciate from the teaching of the embodiments that the advantages of the invention are not limited to the above mentioned.

The described techniques may be implemented as a method, apparatus or article of manufacture involving software, firmware, micro-code, hardware such as logic, memory and/or any combination thereof. The term as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method of retrieving a subset of data from a data repository, the method comprising:
   receiving, by a computing system, a first query including a first logical expression in a Disjunctive Normal Form, wherein the first logical expression includes predicates and logical AND conjuncts;
   representing, by the computing system, each predicate as a bitwise predicate pattern having a bit for each predicate;
   generating a logical bitwise expression, wherein generating the logical bitwise expression includes replacing, by the computing system, each predicate in the first logical expression with its corresponding bitwise predicate pattern and replacing the logical AND conjuncts with bitwise OR operators;
   generating, by the computing system, a second query using the bitwise predicate patterns and bitwise OR operators;
   retrieving the subset of data from the data repository using the second query;
   wherein generating the second query further comprises:
   performing, by the computing system, bitwise OR operations for the bitwise OR operators of the logical bitwise expression, wherein said performing produces a condensed result;
   factoring the condensed result, wherein said factoring produces a factored, condensed result;
   generating a logical predicate expression, wherein said generating a logical predicate expression maps the factored, condensed result to the predicates; and
   generating the second query, wherein generating the second query includes modifying the first query using the logical predicate expression.

2. The method as claimed in claim 1, wherein the factoring includes rearranging the logical bitwise expression using Boolean properties.

3. The method as claimed in claim 1, wherein the data repository includes structured data and the first query and the second query are both Structured Query Language queries.

4. A method of retrieving a subset of data from a relational database, the method comprising:
   receiving, by a computing system, a first Structured Query Language query including a first logical expression in a Disjunctive Normal Form, wherein the logical expression includes predicates and logical AND conjuncts;
   representing, by the computing system, each predicate as a bitwise predicate pattern having a bit for each predicate;
   generating a logical bitwise expression, wherein generating the logical bitwise expression includes replacing, by the computing system, each predicate in the first logical expression with its corresponding bitwise predicate pattern and replacing the logical AND conjuncts with bitwise OR operators;
   generating, by the computing system, a second Structured Query Language query using the bitwise predicate patterns and bitwise OR operators;
   retrieving the subset of data from the data repository using the second Structured Query Language query;
   wherein the step of generating the second Structured Query Language query further comprises:
   performing, by the computing system, bitwise OR operations for the bitwise OR operators of the logical bitwise expression, wherein said performing produces a condensed result;
   factoring the condensed result, wherein said factoring produces a factored, condensed result;
   generating a logical predicate expression, wherein said generating a logical predicate expression maps the factored, condensed result to the predicates; and
   generating the second Structured Query Language query, wherein generating the second query includes modifying the first Structured Query Language query using the logical predicate expression.

5. The method as claimed in claim 4, wherein the factoring includes rearranging the logical bitwise expression using Boolean properties.

6. A system of retrieving a subset of data from a data repository, the system comprising at least one processor and at least one memory, wherein the processor is adapted to:

receive, by a computing system, a first query including a first logical expression in a Disjunctive Normal Form, wherein the first logical expression includes predicates and logical AND conjuncts;

represent, by the computing system, each predicate as a bitwise predicate pattern having a bit for each predicate;

generate a logical bitwise expression, wherein generating the logical bitwise expression includes replacing, by the computing system, each predicate in the first logical expression with its corresponding bitwise predicate pattern and replacing the logical AND conjuncts with bitwise OR operators;

generate, by the computing system, a second query using the bitwise predicate patterns and bitwise OR operators;

retrieve the subset of data from the data repository using the second query;

wherein generating the second query further comprises:

performing, by the computing system, bitwise OR operations for the bitwise OR operators of the logical bitwise expression, wherein said performing produces a condensed result;

factoring the condensed result, wherein said factoring produces a factored, condensed result;

generating a logical predicate expression, wherein said generating a logical predicate expression maps the factored, condensed result to the predicates; and generating the second query, wherein generating the second query includes modifying the first query using the logical predicate expression.

7. The system as claimed in claim 6, wherein factorizing includes rearranging the logical bitwise expression using Boolean properties.

8. A computer program product for retrieving a subset of data from a data repository, the computer program product comprising:

a computer readable storage medium having computer readable program code embodied therewith, the computer readable program code configured to:

receive, by a computing system, a first query including a first logical expression in a Disjunctive Normal Form, wherein the first logical expression includes predicates and logical AND conjuncts;

represent, by the computing system, each predicate as a bitwise predicate pattern having a bit for each predicate;

generate a logical bitwise expression, wherein generating the logical bitwise expression includes replacing, by the computing system, each predicate in the first logical expression with its corresponding bitwise predicate pattern and replacing the logical AND conjuncts with bitwise OR operators;

generate, by the computing system, a second query using the bitwise predicate patterns and bitwise OR operators;

retrieve the subset of data from the data repository using the second query;

wherein generating the second query further comprises:

performing, by the computing system, bitwise OR operations for the bitwise OR operators of the logical bitwise expression, wherein said performing produces a condensed result;

factoring the condensed result, wherein said factoring produces a factored, condensed result;

generating a logical predicate expression, wherein said generating a logical predicate expression maps the factored, condensed result to the predicates; and generating the second query, wherein generating the second query includes modifying the first query using the logical predicate expression.

9. The computer program product as claimed in claim 8, wherein the factorizing includes rearranging the logical bitwise expression using Boolean properties.

* * * * *